US012643623B2

(12) United States Patent　　　　　(10) Patent No.: US 12,643,623 B2
Liu　　　　　　　　　　　　　　　　　(45) Date of Patent: Jun. 2, 2026

(54) SEPARABLE BICYCLE FRAME

(71) Applicant: Yunhui Liu, Sacramento, CA (US)

(72) Inventor: Yunhui Liu, Sacramento, CA (US)

( * ) Notice: Subject to any disclaimer, the term of this patent is extended or adjusted under 35 U.S.C. 154(b) by 307 days.

(21) Appl. No.: 18/687,106

(22) PCT Filed: Oct. 9, 2023

(86) PCT No.: PCT/CN2023/123523
§ 371 (c)(1),
(2) Date: Feb. 27, 2024

(87) PCT Pub. No.: WO2024/082986
PCT Pub. Date: Apr. 25, 2024

(65) Prior Publication Data
US 2025/0121907 A1　Apr. 17, 2025

(30) Foreign Application Priority Data

Oct. 17, 2022　(CN) .......................... 202222720390.2

(51) Int. Cl.
*B62K 15/00* (2006.01)
*B62K 3/02* (2006.01)
*B62K 19/24* (2006.01)
(52) U.S. Cl.
CPC .............. *B62K 15/00* (2013.01); *B62K 19/24* (2013.01); *B62K 3/02* (2013.01)
(58) Field of Classification Search
CPC ......... B62K 15/00; B62K 19/24; B62K 19/18
See application file for complete search history.

(56) References Cited

U.S. PATENT DOCUMENTS 7,584,977 B2 *　9/2009　Huang ................... B62K 19/24
280/278
7,637,522 B2 *　12/2009　Lin .......................... B62K 3/06
280/281.1

(Continued)

FOREIGN PATENT DOCUMENTS

CN　　　215663816 U　*　1/2022
CN　　　114394185 A　　4/2022

*Primary Examiner* — Valentin Neacsu
*Assistant Examiner* — Hosam Shabara
(74) *Attorney, Agent, or Firm* — LEASON ELLIS LLP

(57) ABSTRACT

Disclosed in the present utility model is a separable bicycle frame, comprising a front frame and a rear frame, wherein the front frame comprises a vehicle beam and a steering sleeve, and the rear frame comprises a seat tube, a bottom bracket sleeve, a lower fork, a diagonal fork, and rear connectors; a set of positioning sleeves transversely penetrating the vehicle beam are fixed at a rear part of the vehicle beam of the front frame, and end surfaces for positioning are provided at two ends of each positioning sleeve, respectively; a pair of connection supports are fixed side by side on left and right sides of the seat tube of the rear frame, and a pair of connection supports are fixed side by side on two ends of the bottom bracket sleeve, each pair of connection supports extending forward and respectively clamping the two ends of each positioning sleeve; correspondingly, limiting planes are respectively provided on opposite side surfaces of each pair of connection supports to cooperate with the end surfaces of each positioning sleeve, and each pair of connection supports is provided with transversely penetrating through-holes to cooperate with a tube hole of each positioning sleeve; and a set of bolts and nuts are used to detachably and fixedly connect the front frame and the rear frame.

7 Claims, 3 Drawing Sheets

(56) References Cited

U.S. PATENT DOCUMENTS

| | | | | |
|---|---|---|---|---|
| 7,669,872 B2 * | 3/2010 | Huang | ................. | B62K 15/006 |
| | | | | 280/278 |
| 7,942,434 B2 * | 5/2011 | Myers | ................... | B62K 19/24 |
| | | | | 280/278 |
| 2009/0278332 A1 | 11/2009 | Myers | | |

* cited by examiner

SEPARABLE BICYCLE FRAME

CROSS-REFERENCE TO RELATED PATENT APPLICATIONS

This application is a U.S. National Stage Application under 35 U.S.C. § 371 of International Patent Application No. PCT/CN2023/123523, filed Oct. 9, 2023, which claims the benefit of priority of Chinese Patent Application No. 202222720390.2, filed Oct. 17, 2022, both of which are incorporated by reference in their entireties.

TECHNICAL FIELD

The present utility model relates to the technical field of bicycles and electric bicycles, and aims to propose a separable bicycle frame.

BACKGROUND ART

Existing folding bicycles generally use hinged connections to perform retraction and folding. However, the structure is complex, and it is inconvenient to detach the front and rear frames, so that the outer dimension of the package cannot be further compressed.

A folding bicycle is disclosed in the invention with publication No. CN114394185A. The key points of the technical solution thereof include a bicycle frame, a front fork connecting column, a bicycle front fork, a bicycle rear fork bracket, a lock faucet, a lock faucet mounting rod and a return spring. A seat, the frame and handlebars are retracted and folded to fold and fix the bicycle together. The folding structure is complex, and it is inconvenient to detach and separate the front fork connecting column and the bicycle frame. The volume of the folded bicycle body is still large.

SUMMARY

In view of the above-mentioned shortcomings in the prior art, provided in the present utility model is a separable bicycle frame, in which the connection structure of front and rear frames is simplified, and the front and rear frames can be easily separated, thereby reducing the package size and reducing transportation and storage costs.

To achieve the above objective, the present utility model adopts the following technical solution:

A separable bicycle frame, comprising a front frame and a rear frame, wherein the front frame comprises a vehicle beam and a steering sleeve fixed to a front end of the vehicle beam; the rear frame comprises a seat tube, and a bottom bracket sleeve, a lower fork, a diagonal fork, and rear connectors fixed at a lower part of the seat tube, the bottom bracket sleeve is fixed at the lower part of the seat tube, a front end of the lower fork is fixedly connected to the bottom bracket sleeve, a pair of rear connectors is fixed at a rear part of the lower fork, and the diagonal fork is fixedly connected to the seat tube and the rear connectors, respectively; a set of positioning sleeves transversely penetrating the vehicle beam are fixed at a rear part of the vehicle beam of the front frame, and end surfaces for positioning are provided at two ends of each positioning sleeve, respectively; in cooperation with the positioning sleeves, a pair of connection supports are fixed side by side on left and right sides of the seat tube of the rear frame, and a pair of connection supports are fixed side by side on two ends of the bottom bracket sleeve, each pair of connection supports extending forward and respectively clamping the two ends of each positioning sleeve; and correspondingly, limiting planes are respectively provided on opposite side surfaces of each pair of connection supports to cooperate with the end surfaces of each positioning sleeve, and each pair of connection supports is provided with transversely penetrating through-holes to cooperate with a tube hole of each positioning sleeve; and a set of bolts are used to pass through the tube holes of the positioning sleeves and the through-holes of the connection supports, and are matched with nuts to detachably and fixedly connect the front frame and the rear frame.

Preferably, the connection supports of the rear frame are provided on a pair of integrated supports arranged side by side, and the integrated supports are fixedly connected to the seat tube and the bottom bracket sleeve, respectively; and in cooperation with the positioning sleeves, limiting planes are respectively provided on opposite side surfaces of the integrated supports to cooperate with the end surfaces of each positioning sleeve, and the integrated supports are respectively provided with transversely penetrating through-holes to cooperate with the tube holes of the positioning sleeves.

Preferably, two positioning sleeves are fixed at the rear part of the vehicle beam; and correspondingly, the integrated supports are respectively provided with two pairs of transversely penetrating through-holes to cooperate with the tube holes of the positioning sleeves.

Alternatively, three positioning sleeves are fixed at the rear part of the vehicle beam; and correspondingly, the integrated supports are respectively provided with three pairs of transversely penetrating through-holes to cooperate with the tube holes of the positioning sleeves.

Further, the integrated supports are sheet metal components.

The present utility model has the following beneficial effects:

(1) The frame is divided into a front frame and a rear frame that are separable, which can reduce the package size and reduce transportation and storage costs.

(2) The connection structure of the front and rear frames is simplified, and the bolts and nuts are used for fastening and connection, which facilitates detachment and installation of the front and rear frames. Moreover, different forms of front and rear frames can all be matched and installed using this connection structure to form different models, thereby meeting different consumer needs.

Figure 1:
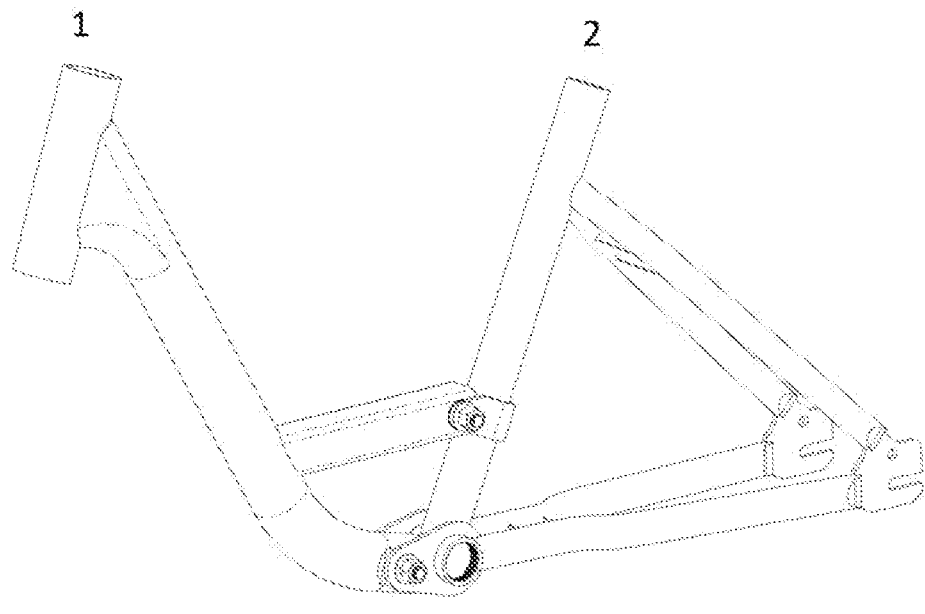
FIG. 1 is a schematic perspective view of the present utility model.

Description of the figures: 1. front frame; 1-1. vehicle beam; 1-2. steering sleeve; 1-3. positioning sleeve (A); 1-4. positioning sleeve (B); 1-5. positioning base; 2. rear frame;

2-1. seat tube; 2-2. bottom bracket sleeve; 2-3. lower fork; 2-4. diagonal fork; 2-5. rear connector; 2-6. first connection support; 2-7. second connection support; 2-8. sheet metal component (A); 2-9. sheet metal component (B); 2-10. bottom bracket casing; 2-11. sheet metal component (C); 3. bolt (A); 4. nut (A); 5. bolt (B); and 6. nut (B).

DETAILED DESCRIPTION

In order to make the objectives, technical solutions, and advantages of the present utility model more clear, further description is made below in conjunction with the drawings and embodiments. The described embodiments are some of the embodiments of the present utility model. Assemblies of the embodiments described and illustrated in the drawings may be arranged and designed with a variety of different configurations. The following description of the embodiments in the drawings is not intended to limit the claimed scope of protection, but represents preferred embodiments of the present utility model. Based on the embodiments, other embodiments obtained by those skilled in the art without the exercise of inventive effort are all within the scope of protection of the present utility model.

In the description of the present utility model, the drawings shown are only used to explain the contents of the description and claims, and are not limitations of the implementation. Any adjustment of the structure, shape, scale or size should still fall within the scope of protection of the present utility model as long as it does not affect the substantial technical content. Meanwhile, the terms such as "front," "back," "left," "right," "upper," "lower," "horizontal," "side," and "oblique" used herein are only for the convenience of description. Changes or adjustments in relative relationships thereof, without substantial changes in technical content, are also deemed as falling within the implementation scope of the present utility model.

It should be noted that terms such as "include" and other similar terms used herein specify the presence of the stated feature, element, and component, but do not exclude the presence or addition of one or more other features, elements and components, and/or other groups thereof.

It should also be noted that, unless otherwise expressly stated and defined, the terms "fixed" and "fixedly connected" should be understood in a broad sense, and may be a direct fixed connection or an indirect fixed connection by means of an intermediate medium. For example, for the description "a bottom bracket sleeve is fixed at a lower part of a seat tube", the lower part of the seat tube and the bottom bracket sleeve may be directly and fixedly connected, or may be arranged at an interval and offset and fixedly connected through a connector. For those skilled in the art, the specific meanings of the above terms in the present utility model could be understood according to specific circumstances. In addition, the vehicle beam of the front frame may be in different forms, such as a straight beam, a curved beam, and two beams consisting of upper and lower beams. Correspondingly, a set of positioning sleeves are fixed at the rear part of the vehicle beam.

Specific embodiments of the present utility model will be described in detail below with reference to FIGS. 1-6.

Embodiment 1

Figure 2:
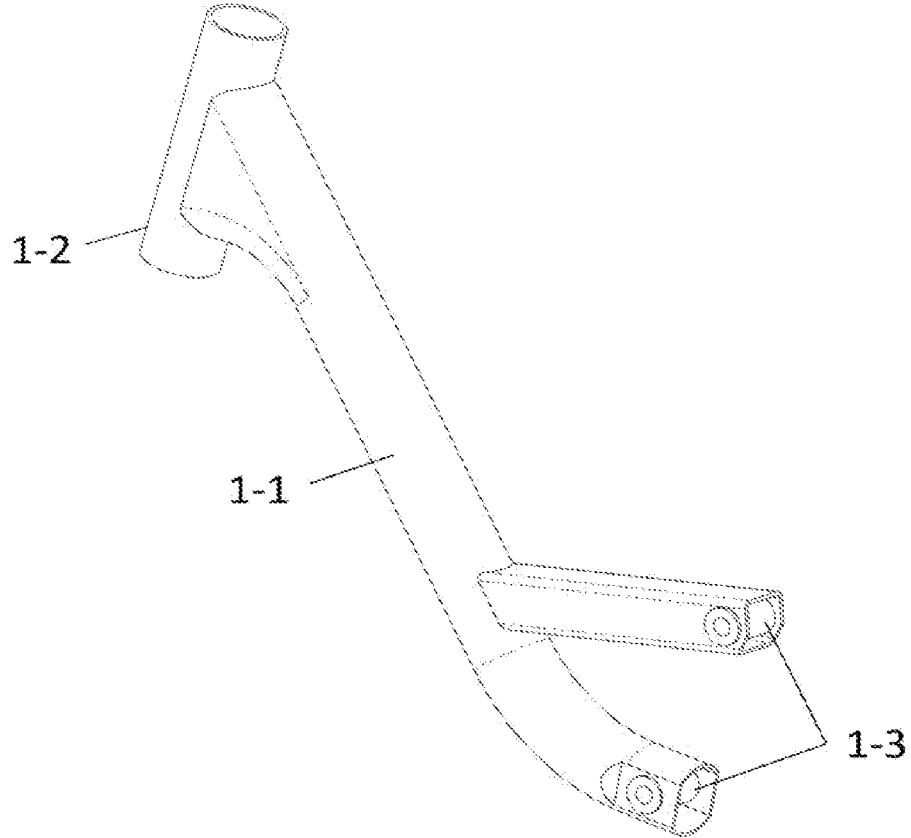
FIG. 2 is a schematic perspective view of a front frame according to Embodiment 1 of the present utility model.
Figure 3:
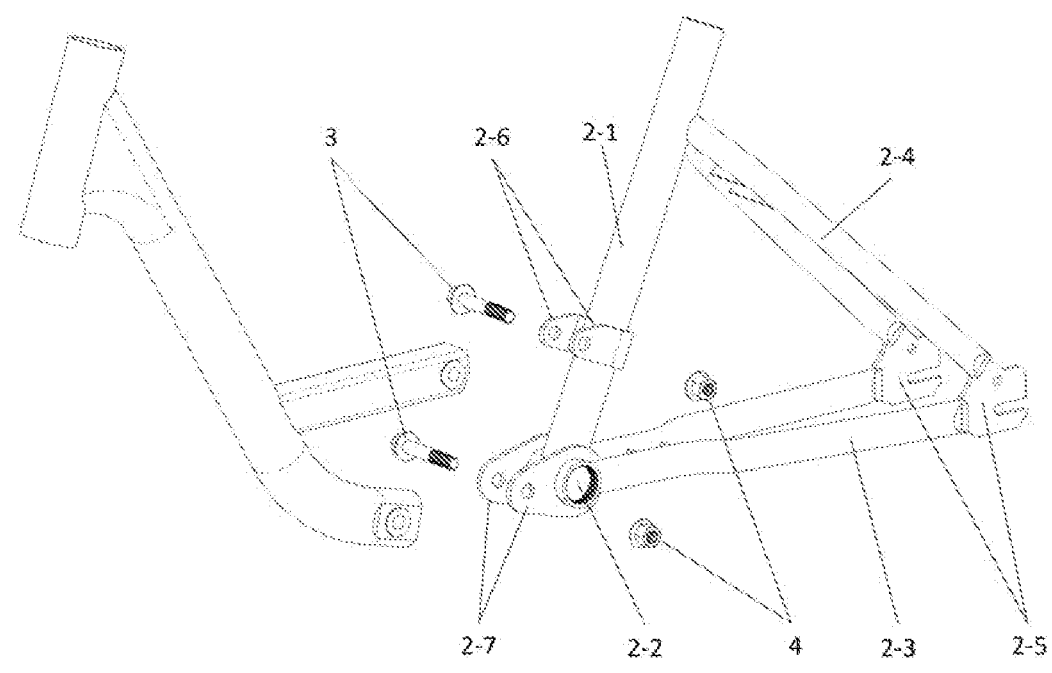
FIG. 3 is an exploded perspective view according to Embodiment 1 of the present utility model.

As shown in FIG. 1, a separable bicycle frame includes a front frame 1 and a rear frame 2. As shown in FIG. 2, the front frame 1 includes a vehicle beam 1-1 and a steering sleeve 1-2 fixed at a front end of the vehicle beam 1-1. As shown in FIG. 3, the rear frame 2 includes a seat tube 2-1, a bottom bracket sleeve 2-2, a lower fork 2-3, a diagonal fork 2-4 and rear connectors 2-5. The bottom bracket sleeve 2-2 is fixed at a lower part of the seat tube 2-1, a front end of the lower fork 2-3 is fixedly connected to the bottom bracket sleeve 2-2, a pair of rear connectors 2-5 is fixed at a rear part of the lower fork 2-3, and the diagonal fork 2-4 is fixedly connected to the seat tube 2-1 and the rear connectors 2-5, respectively. As shown in FIG. 2, two positioning sleeves (A) 1-3 transversely penetrating the vehicle beam 1-1 are fixed at a rear part of the vehicle beam 1-1, and end surfaces for positioning are provided on two ends of the positioning sleeve (A) 1-3, respectively. As shown in FIG. 3, in cooperation with the positioning sleeves (A) 1-3, a pair of first connection supports 2-6 are fixed side by side on left and right sides of the seat tube 2-1 of the rear frame 2, and a pair of second connection supports 2-7 are also fixed side by side at two ends of the bottom bracket sleeve 2-2. The first connection supports 2-6 and the second connection supports 2-7 both extend forward and respectively clamp two ends of each positioning sleeve (A) 1-3. Correspondingly, limiting planes are respectively provided on opposite side surfaces of the first connection supports 2-6 and the second connection supports 2-7 to cooperate with the end surfaces of each positioning sleeve (A) 1-3, and the first connection supports 2-6 and the second connection supports 2-7 are each provided with transversely penetrating through-holes to cooperate with a tube hole of each positioning sleeve (A) 1-3. Bolts (A) 3 are used to pass through the tube holes of the positioning sleeves and the through-holes of the connection supports, and are matched with nuts (A) 4 to detachably and fixedly connect the front frame 1 and the rear frame 2.

Embodiment 2

Figure 4:
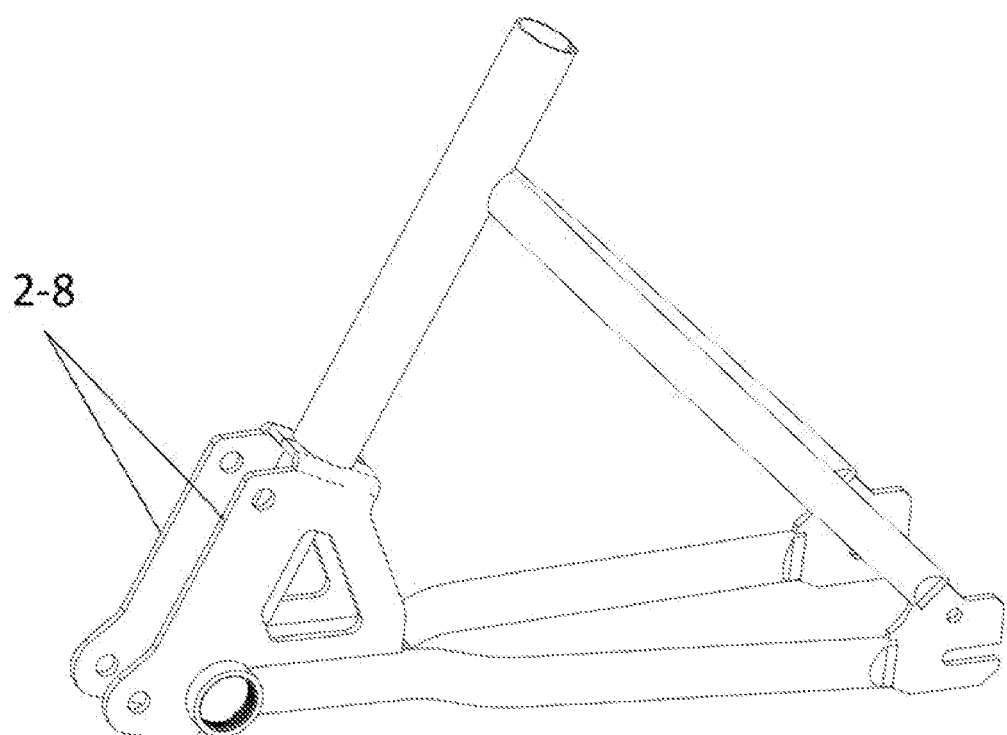
FIG. 4 is a schematic perspective view of a rear frame according to Embodiment 2 of the present utility model.

Embodiment 2 is different from Embodiment 1 in that: as shown in FIGS. 2 and 4, the connection supports of the rear frame 2 are a pair of sheet metal components (A) 2-8 arranged side by side, and the sheet metal components are correspondingly fixedly connected to the seat tube 2-1 and the bottom bracket sleeve 2-2, respectively, and cooperate with the tube holes of the positioning sleeves (A) 1-3 of the front frame 1. The sheet metal components (A) 2-8 are provided with two pairs of transversely penetrating through-holes.

Embodiment 3

Figure 5:
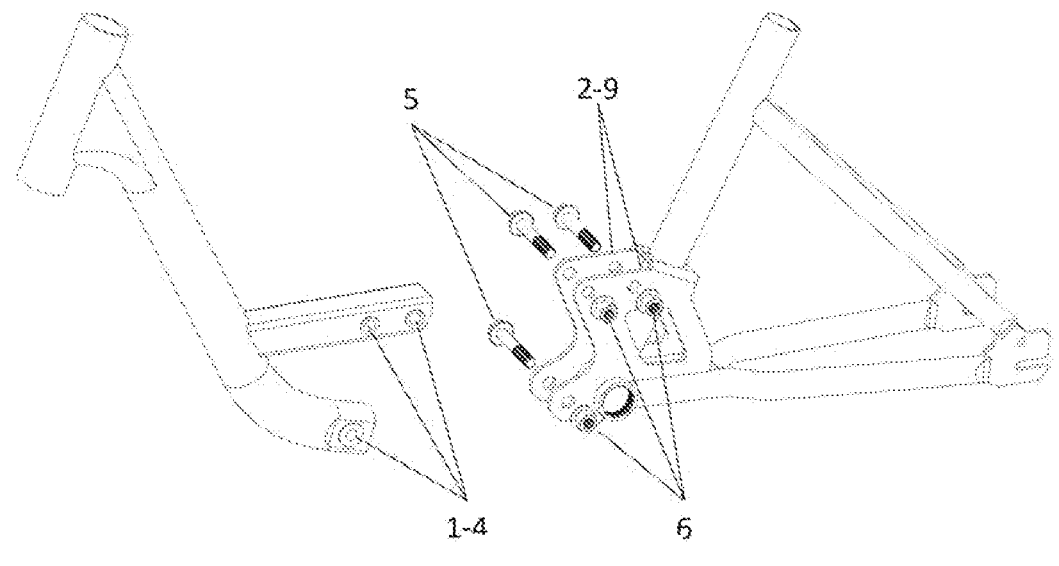
FIG. 5 is an exploded perspective view according to Embodiment 3 of the present utility model.

Embodiment 3 is different from Embodiments 1 and 2 in that: as shown in FIG. 5, three positioning sleeves (B) 1-4 transversely penetrating the rear part of the vehicle beam 1-1 are fixed on the front frame 1; correspondingly, sheet metal components (B) 2-9 are provided with three pairs of transversely penetrating through-holes to cooperate with the tube holes of the positioning sleeves (B) 1-4; and bolts (B) 5 are used to pass through the tube holes of the positioning sleeves (B) 1-4 and the through-holes of the sheet metal components (B) 2-9, and are matched with nuts (B) 6 to detachably and fixedly connect the front frame 1 and the rear frame 2.

Embodiment 4

Figure 6:
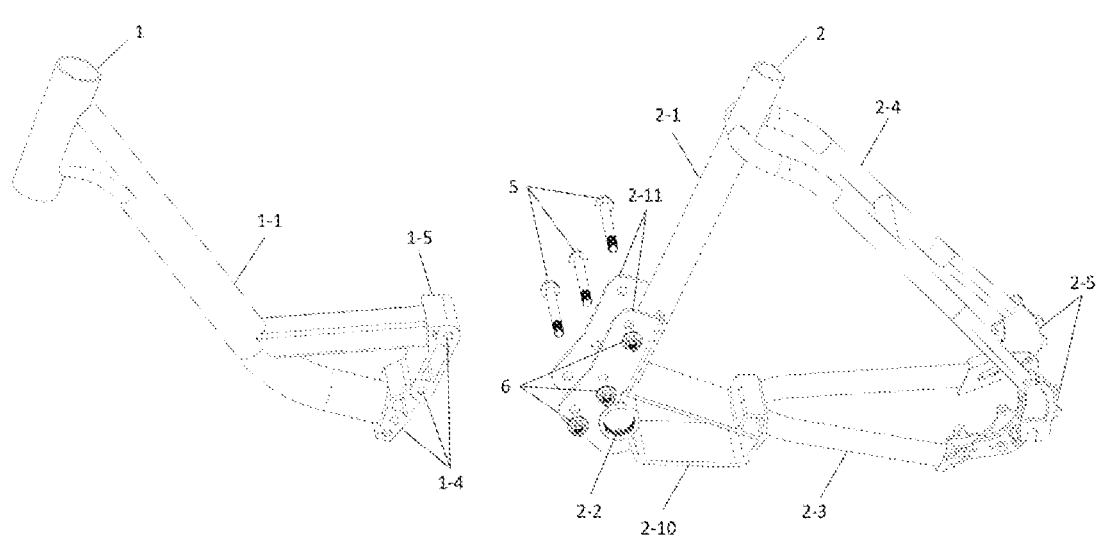
FIG. 6 is an exploded perspective view according to Embodiment 4 of the present utility model.

Embodiment 4 is different from Embodiments 1, 2 and 3 in that: as shown in FIG. 6, the three positioning sleeves (B) 1-4 are combined with the connection structure to be designed as a positioning base 1-5, which is fixedly connected to the rear part of the vehicle beam 1-1; the bottom bracket sleeve 2-2 is combined with the connection structure to be designed as a bottom bracket casing 2-10, which is fixedly connected to the lower part of the seat tube 2-1 and the front end of the lower fork 2-3, respectively; a pair of sheet metal components (C) 2-11 are correspondingly fixedly connected to the bottom bracket casing 2-10 and the lower part of the seat tube 2-1, respectively, and cooperate with the positioning base 1-5; and the sheet metal components (C) 2-11 are provided with three pairs of transversely penetrating through-holes. The front frame 1 and the rear frame 2 are detachably fixedly connected by means of the bolts (B) 5 and the nuts (B) 6.

Compared with existing folding bicycle frames, the present utility model simplifies the connection structure of the front and rear frames, so that the front and rear frames can be completely separated, further reducing the size of the outer dimension and reducing transportation and storage costs. Moreover, different forms of front and rear frames can be matched and installed using this connection structure to form different models, thereby meeting different consumer needs. Further, the present utility model may also be used as a separable electric bicycle frame.

The above embodiments only describe the preferred embodiments of the technical solution of the present invention, and are not intended to limit the scope of the present utility model. Without departing from the design principles and characteristics of the present utility model, various modifications and improvements made by those of ordinary skill in the art to the technical solution of the present utility model should all fall within the scope of protection determined by the present utility model.

The invention claimed is:

1. A separable bicycle frame, comprising a front frame and a rear frame, wherein the front frame comprises a vehicle beam and a steering sleeve fixed to a front end of the vehicle beam; and the rear frame comprises a seat tube, a bottom bracket sleeve, a lower fork, a diagonal fork, and rear connectors, the bottom bracket sleeve is fixed at a lower part of the seat tube, a front end of the lower fork is fixedly connected to the bottom bracket sleeve, the rear connectors is fixed at a rear part of the lower fork, and the diagonal fork is fixedly connected to the seat tube and the rear connectors, respectively; characterized in that: a set of positioning sleeves transversely penetrating the vehicle beam are fixed at a rear part of the vehicle beam of the front frame, and end surfaces for positioning are provided at two ends of each positioning sleeve, respectively;

in cooperation with the positioning sleeves, first connection supports are fixed side by side on left and right sides of the seat tube of the rear frame, second connection supports are fixed side by side on two ends of the bottom bracket sleeve, the first and second connection supports extending forward and respectively clamping the two ends of each positioning sleeve; and correspondingly, limiting planes are respectively provided on opposite side surfaces of the first and second connection supports to cooperate with the end surfaces of each positioning sleeve, and the first and second connection supports is provided with transversely penetrating through-holes to cooperate with a tube hole of each positioning sleeve; and a set of bolts are used to pass through the tube holes of the positioning sleeves and the through-holes of the connection supports, and are matched with nuts to detachably and fixedly connect the front frame and the rear frame.

2. The separable bicycle frame according to claim 1, wherein: the first and second connection supports of the rear frame are provided on integrated supports arranged side by side, and the integrated supports are fixedly connected to the seat tube and the bottom bracket sleeve, respectively; and in cooperation with the positioning sleeves, limiting planes are respectively provided on opposite side surfaces of the integrated supports to cooperate with the end surfaces of each positioning sleeve, and the integrated supports are respectively provided with transversely penetrating through-holes to cooperate with the tube holes of the positioning sleeves.

3. The separable bicycle frame according to claim 2, wherein: two positioning sleeves are fixed at the rear part of the vehicle beam; and correspondingly, the integrated supports are respectively provided with two pairs of transversely penetrating through-holes to cooperate with the tube holes of the positioning sleeves.

4. The separable bicycle frame according to claim 2, wherein: three positioning sleeves are fixed at the rear part of the vehicle beam; and correspondingly, the integrated supports are respectively provided with three pairs of transversely penetrating through-holes to cooperate with the tube holes of the positioning sleeves.

5. The separable bicycle frame according to claim 2, wherein the integrated supports are sheet metal components.

6. The separable bicycle frame according to claim 3, wherein the integrated supports are sheet metal components.

7. The separable bicycle frame according to claim 4, wherein the integrated supports are sheet metal components.

* * * * *